US006024083A

United States Patent [19]

Smirnov

[11] Patent Number: 6,024,083

[45] Date of Patent: Feb. 15, 2000

[54] RADIANT TUBE BURNER NOZZLE

[75] Inventor: Valeriy Smirnov, Loves Park, Ill.

[73] Assignee: Eclipse Combustion, Inc., Rockford, Ill.

[21] Appl. No.: 09/208,263

[22] Filed: Dec. 8, 1998

[51] Int. Cl.[7] .............................. F24C 3/00; F23D 14/46; F27B 5/14; B05B 7/10

[52] U.S. Cl. ..................... 126/91 A; 126/92 C; 431/353; 431/350; 431/8; 431/9; 431/284; 432/209; 239/406; 239/433

[58] Field of Search ............................... 126/91 A, 92 C; 431/353, 352, 350, 284, 285, 8, 9, 116; 432/209; 239/406, 424.5, 433

[56] References Cited

U.S. PATENT DOCUMENTS

| | | | |
|---|---|---|---|
| 344,808 | 7/1886 | Bradberry . | |
| 1,315,462 | 9/1919 | Brown . | |
| 2,368,179 | 1/1945 | Turpin | 431/352 |
| 3,117,726 | 1/1964 | Schoberg | 239/291 |
| 3,226,034 | 12/1965 | Helman | 239/316 |
| 3,304,014 | 2/1967 | Hancock et al. | 239/548 |
| 4,014,639 | 3/1977 | Froehlich | 431/353 |
| 4,060,874 | 12/1977 | Furutsutsumi | 15/405 |
| 4,269,358 | 5/1981 | Ohtani et al. | 239/425 |
| 4,347,984 | 9/1982 | Sickles | 239/707 |
| 4,630,771 | 12/1986 | Hall | 237/17 |
| 4,673,350 | 6/1987 | Collier | 431/353 |
| 4,705,022 | 11/1987 | Collier | 126/91 A |
| 5,049,066 | 9/1991 | Kaiya et al. | 431/352 |
| 5,176,324 | 1/1993 | Furuse et al. | 239/419 |
| 5,241,949 | 9/1993 | Collier | 126/91 A |
| 5,882,184 | 3/1999 | Feldermann | 431/9 |

*Primary Examiner*—Ira S. Lazarus
*Assistant Examiner*—David Lee
*Attorney, Agent, or Firm*—Leydig, Voit & Mayer, Ltd.

[57] ABSTRACT

A nozzle for a recuperative radiant tube burner system is constructed to provide uniform combustion along the length of the inner tube. The nozzle includes combustion air ports disposed at compound angles and having different axial components to provide staged mixing of air and fuel. The staged mixing produces a combustible mixture along the length of the tube to produce a more uniform flame. The nozzle further has an outer wall disposed normal to the combustion air ports to improve air flow through the ports. A fuel outlet tube has relief ports for continuing fuel flow in the event that a main orifice is plugged, which may result from air pressure fluctuations in the burner system.

15 Claims, 5 Drawing Sheets

14
13
37
61
10
30
32

60
11
15
35
12
17
16
22
36
38
20
31
27
21
25
26

3
3
45
D
50B
44C
C3
44B
41
49C
C2
50A
44A
47
30
C1
49A
49B
40
65
B
4
4

RADIANT TUBE BURNER NOZZLE

FIELD OF THE INVENTION

This invention relates generally to burner nozzles and, more particularly, to burner nozzles for use in a recuperative radiant tube heating system.

BACKGROUND OF THE INVENTION

A single-ended recuperative (SER) radiant tube heating system is disclosed in Collier U.S. Pat. No. 5,241,949. In general, an SER radiant tube heating system comprises an outer heat-resistant radiant tube having a closed forward end. Located within the outer radiant tube is an elongated inner tube which coacts with the radiant tube to define an annular exhaust passage for the flow of hot combustion products produced by a burner assembly. The burner assembly includes a nozzle which is supplied with gaseous fuel by way of a gas supply pipe. The inner tube may be divided into two portions. A recuperator portion is defined as the portion of the inner tube which extends upstream of the nozzle, and a firing portion is defined as the portion of the inner tube which extends downstream of the nozzle.

In operation, gaseous fuel and combustion air are supplied to the nozzle and are mixed therein to produce an intense flame which travels along the firing portion of the inner tube. The flame directly heats the firing portion of the inner tube which, in turn radiates heat to the radiant tube. Combustion products discharged from the forward end of the inner tube strike the closed end of the radiant tube and flow reversely in the annular passage between the two tubes to further heat the radiant tube by convection. The hot combustion products also heat the recuperator portion of the inner tube which, in turn, preheats the combustion air flowing inside the inner tube toward the nozzle.

Most conventional radiant tube heaters, however, have an unacceptable Nox emission level. Such heaters unevenly distribute air and fuel, which results in uneven combustion downstream of the nozzle. Uneven combustion creates localized areas of elevated temperature, called hot spots, near the nozzle. The hot spots not only cause undue wear, but also cause the burner to generate higher Nox emissions.

Previous SER radiant tube heating systems, such as the one disclosed in the Collier patent, have taught the use of a nozzle having combustion air ports oriented to create a spiral flow pattern. The spiral air flow improves mixing of the air and fuel, resulting in improved temperature uniformity along the length of the inner tube and, consequently, improved quality of combustion. Despite these improvements, radiant tube heating systems using such combustion air ports still develop hot spots along with inner tube, thereby limiting the maximum input for the heating system.

Flame detection in previous SER burners is also overly difficult. The flame produced in such conventional systems during low input situations is typically concentrated near the axis of the tube and only shortly downstream of the nozzle. As a result, the nozzle structure itself often blocks a direct view of the flame, rendering flame sensing ineffective. Furthermore, mixing under low input conditions is often incomplete, resulting in a flame which produces a relatively weak UV signal. Under high input conditions, combustion takes place further downstream of the nozzle. The movement of the flame makes it difficult to provide unobstructed right lines which allow a sensing device to sense the flame over a range of inputs.

Not only is flame detection difficult, but problems with flame detection in conventional heating systems also serves to overly limit the operating range of those systems. For example, a heating system may have a 10:1 fuel turndown, referred to herein as a physical turndown ratio. Conventional systems, however, are typically capable of sensing UV over a smaller range, such as a 3:1 turndown, referred to herein as a UV turndown ratio. As a result, the operating ranges of conventional systems are overly limited by the UV turndown ratio.

In addition, it has been found that, during cold start conditions, burner systems often experience varying back pressures which act to plug the flow of fuel through the gas supply pipe. The cold conditions during startup often cause less stable combustion, and therefore combustion air is consumed at continually varying rates. The unstable combustion creates periodic back pressures which act to restrict or completely plug the flow of fuel from the pipe. Conventional burners, therefore, do not consistently maintain flame during cold start operation.

SUMMARY OF THE INVENTION

In light of the above, a general aim of the present invention is to provide a nozzle for a recuperative radiant tube heating system which more uniformly mixes fuel and air along the entire length of the recuperative tube.

In that regard, it is also an object of the present invention to provide a nozzle for a recuperative radiant tube heating system which minimizes hot spots, thereby increasing the life of the system.

Further in that regard, it is an object of the present invention to provide a nozzle for a recuperative radiant tube heating system which minimizes Nox emissions.

A related object of the present invention is to provide a nozzle for a recuperative radiant tube heating system which has a more uniform flow of combustion products downstream of the nozzle, thereby improving uniformity of combustion.

It is also an object of the present invention to provide a nozzle for a radiant tube heating system which improves the ability to sense flame in the system over a range of inputs.

In that regard, it is an object of the present invention to provide a nozzle for a radiant tube heating system which maximizes the UV turndown ratio of the system.

Yet another object of the present invention is to provide a nozzle for a recuperative radiant tube heating system which maintains stable flows of fuel and combustion air despite air pressure fluctuations during cold start conditions.

Accordingly, the present invention provides a recuperative radiant tube heating system having a new and improved nozzle for producing uniform combustion along the length of the recuperative tube. The nozzle incorporates combustion air ports formed at compound angles to produce a swirling or helical gas flow. The combustion air ports are arranged in zones. All of the ports in a given zone are oriented at substantially the same axial angle, each zone having a particular axial angle. As a result, a multi-staged combustion is produced downstream of the nozzle.

More specifically, the combustion air ports located closest to the center of the nozzle are aligned at an axial angle so that combustion air flowing through those ports mixes with fuel and ignites shortly downstream of the nozzle. Each subsequent zone of combustion air ports positioned further from the nozzle center has air ports with an axial angle disposed to mix and combust at points increasingly farther downstream along the recuperative tube. As a result, a more uniform combustion is created along the length of the inner tube, thereby minimizing hot spots which limit the maximum input into the heating system. The staged combustion further ensures that flame will be visible by an UV scanner over the full range of inputs.

To improve mixing of fuel of air and more accurately direct the different stages of spiral flow patterns, the nozzle of the present invention provides for better air flow distribution through the combustion air ports. A rear face of the nozzle is formed so that it is normal to the angle of the combustion air ports extending therethrough. As a result, combustion air has a substantially uniform velocity as it flows through each combustion air port, thereby providing a more precisely directed flow of combustion air for mixing. It will be appreciated that, when used with the staged combustion air ports described above, the rear face of the nozzle will be multi-tiered to accommodate for the different combustion air port angles.

The present invention also allows fuel to continue to flow in the event of air pressure fluctuations. The nozzle is attached to the fuel supply pipe and has an outlet tube with a discharge orifice. The outlet tube projects into a mixing portion of the nozzle so that the orifice discharges fuel downstream of at least some of the combustion air ports. The outlet tube includes at least one relief port located upstream of the orifice. The relief port minimizes the effect of combustion air pressure fluctuations at the orifice by providing a secondary path through which fuel may flow. As a result, the nozzle more reliably provides at least some amount of fuel flow under most combustion air pressure conditions. Air is not introduced at the base of the nozzle to eliminate turbulence and minimize pressure fluctuations.

These and other aims, objectives, and features of the invention will become more apparent from the following detailed description when taken in conjunction with the accompanying drawings.

Figure 1:
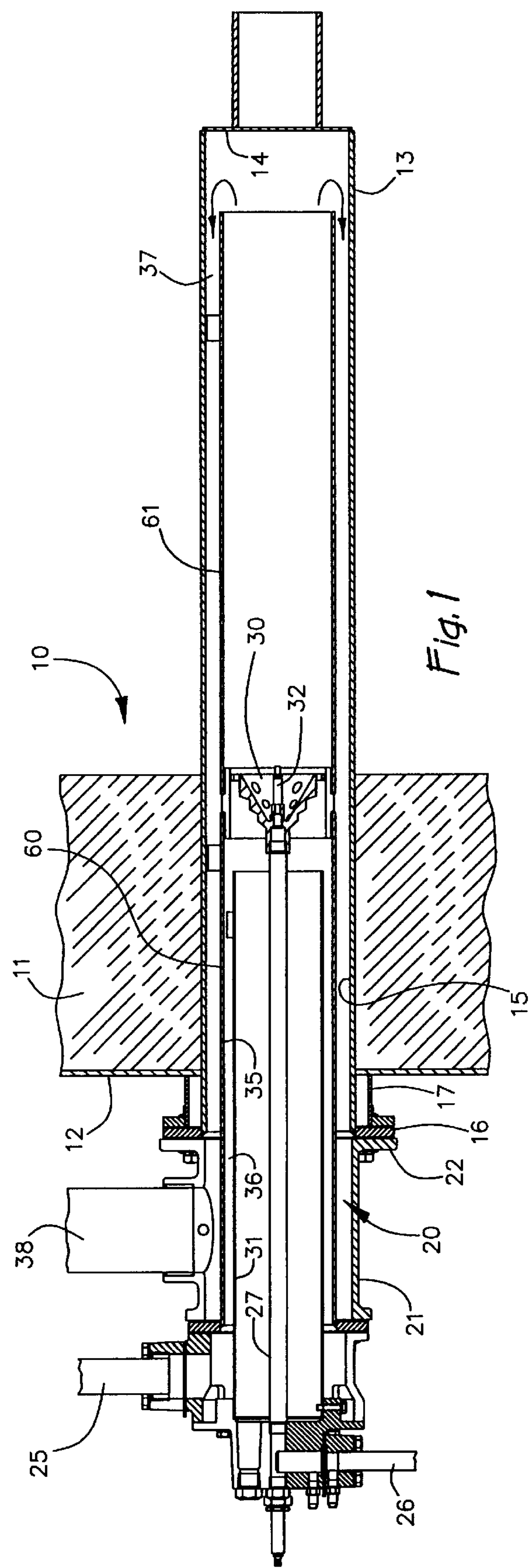
FIG. 1 is a fragmentary cross-section taken longitudinally through a new and improved radiant tube heating system incorporating the unique features of the present invention and shows the system installed in a typical furnace.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration, the invention has been shown in the drawings in conjunction with a radiant tube heating system of the type which is conventionally used to heat the chamber of a furnace such as a heat treating furnace. One wall 10 of a furnace is shown in FIG. 1 and is typically made of refractory material 11 whose outer side is covered by a metal skin 12.

The heating system includes an elongated radiant tube 13 disposed within the furnace chamber and made of a metallic, silicon carbide, or other suitable heat-resistant material. The forward or downstream end of the radiant tube is closed as indicated at 14.

The radiant tube 13 extends through a hole 15 in the furnace wall 10 and includes a mounting flange 16 which is secured rigidly to a mounting sleeve 17 on the outer side of the wall. A burner assembly 20 is secured to and is partially disposed in the radiant tube and is operable to produce a high temperature flame for heating the furnace. The burner assembly includes an outer housing 21 having a mounting flange 22 which is releasably secured to the mounting flange 16 of the radiant tube 13. A combustion air pipe 25 extends into one side of the housing and communicates with a blower (not shown) or other means for producing a flow of forced combustion air. Also connected to the housing is a fuel supply line 26 which communicates with an elongated fuel pipe 27. The fuel pipe 27 extends down the center of the radiant tube 13 and supports a burner nozzle 30 on its forward or downstream end. The nozzle 30 is adapted to receive fuel and combustion air and to mix the two together. The present invention contemplates the use of any type of gaseous heating fuel, including natural gas, butane, and propane.

Telescoped over and spaced radially from the fuel pipe 27 is an air tube 31 (FIG. 1) whose rear end is secured rigidly to the housing 21 and whose forward end terminates short of the nozzle 30. An elongated spark rod 32 extends through the tube 31 and the nozzle 30 and includes an electrode which is positioned just downstream of the burner head in order to ignite the fuel/air mixture discharged therefrom.

The overall burner assembly 20 is completed by an elongated inner tube 35 whose rear or upstream end forms a recuperator portion 60 connected to the burner housing 21 in such a manner as to enable the tube 35 to communicate with the combustion air line 25. As shown in FIG. 1, the inner tube 35 is spaced radially outwardly from the air tube 31 and coaxial therewith to define an annular passage 36 accommodating the flow of combustion air to the nozzle 30 and establishing a flow of relatively high velocity. The inner tube 35 extends well past the nozzle 30 to form a firing tube portion 61 with a forward end spaced just upstream of the closed end 14 of the radiant tube 13. An annular passage 37 is defined between the radiant tube 13 and the inner tube 35 and permits exhaust gases to flow reversely along the inner tube to a discharge pipe 38 which communicates with an exhaust flue.

With the foregoing arrangement, fuel flows to the nozzle 30 through the fuel supply pipe 27 while combustion air is supplied to the nozzle via the annular passage 36 between the tubes 31 and 35. The gas and combustion air are mixed by the nozzle 30 and, as the mixture is discharged from the nozzle, it is ignited by the spark electrode 32 to produce a flame. A flame travels down the forward end of the inner tube 35 and combustion products discharged from the tube 35 are deflected by the closed end 14 of the radiant tube 13 to flow within the exhaust passage 37 and reversely along the tubes 13, 35 to the exhaust line 38. It will be appreciated, therefore, that the inner tube 35 may be divided into a recuperator portion 60 and a firing tube portion 61. The recuperator portion 60 extends upstream of the nozzle 30 and preheats the combustion air entering the system. The firing tube portion 61 extends downstream of the nozzle to define an area of combustion. The radiant tube 13 is heated both by radiation from the inner tube 35 and by convection from the hot combustion products.

The present invention contemplates the provision of a new and improved nozzle 30 which is constructed to create more uniform and consistent combustion along the entire length of the inner tube. This is achieved by directing combustion air at a number of points along the tube. As a result, combustion is spread out along the length of the tube rather than focused at a particular point along the tube, thereby creating more uniform combustion and avoiding the creation of hot spots.

Figure 2:
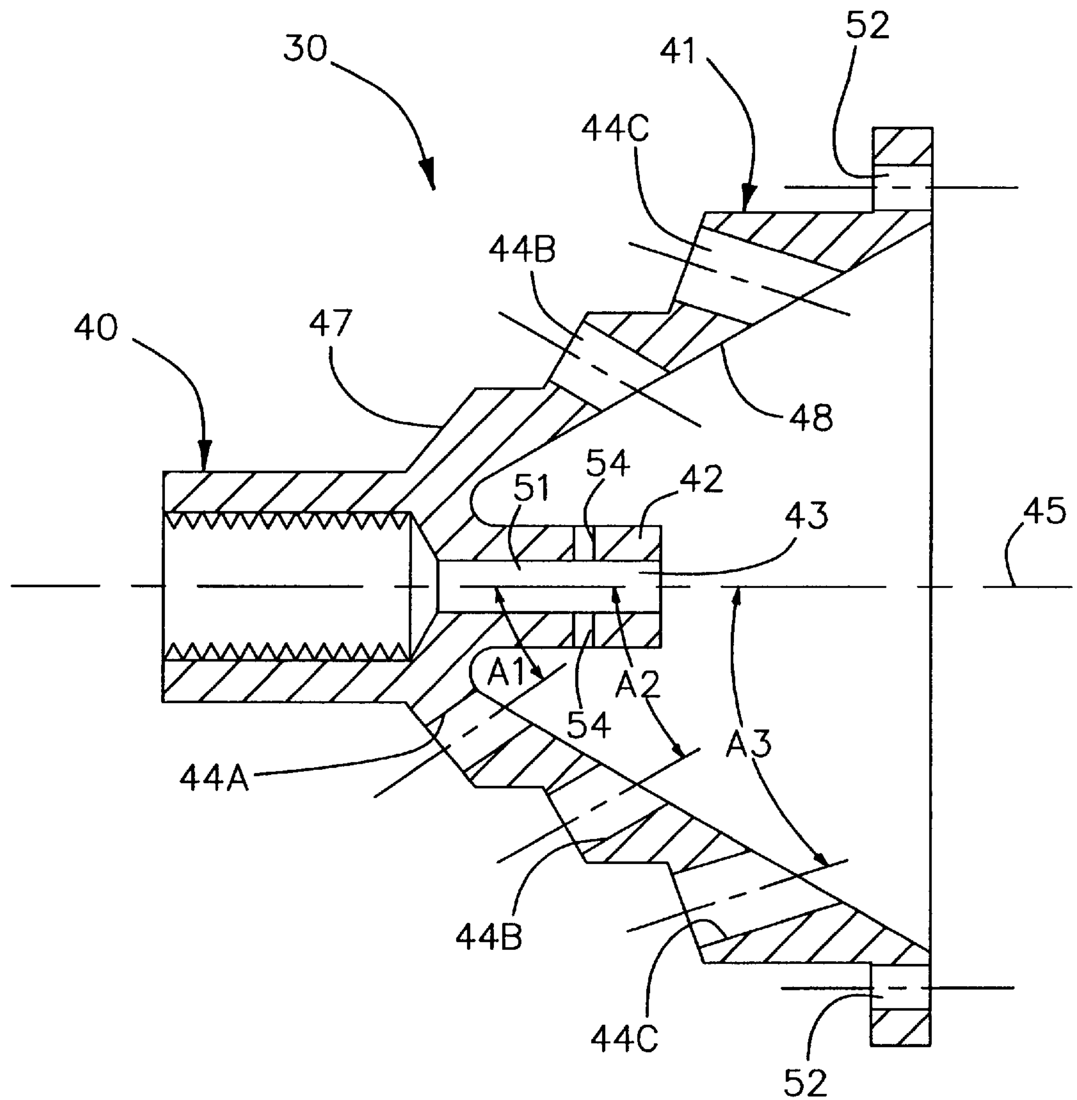
FIG. 2 is an enlarged cross-sectional view primarily illustrating the nozzle shown in FIG. 1.

More specifically, nozzle 30 has a generally cylindrical upstream collar 40 and a downstream mixing portion 41. The upstream end portion of the collar 40 is internally threaded as shown in FIG. 2 and is adapted to be fastened onto the downstream end portion of the fuel pipe 27. An outlet tube 42 projects from a downstream end of the collar 40 into the mixing portion 41. A passage 51 extends through the outlet tube 42 and provides an orifice 43 for discharging fuel. The orifice 43 discharges fuel substantially along a horizontal axis 45 about which the nozzle 30 is disposed.

Figure 4:
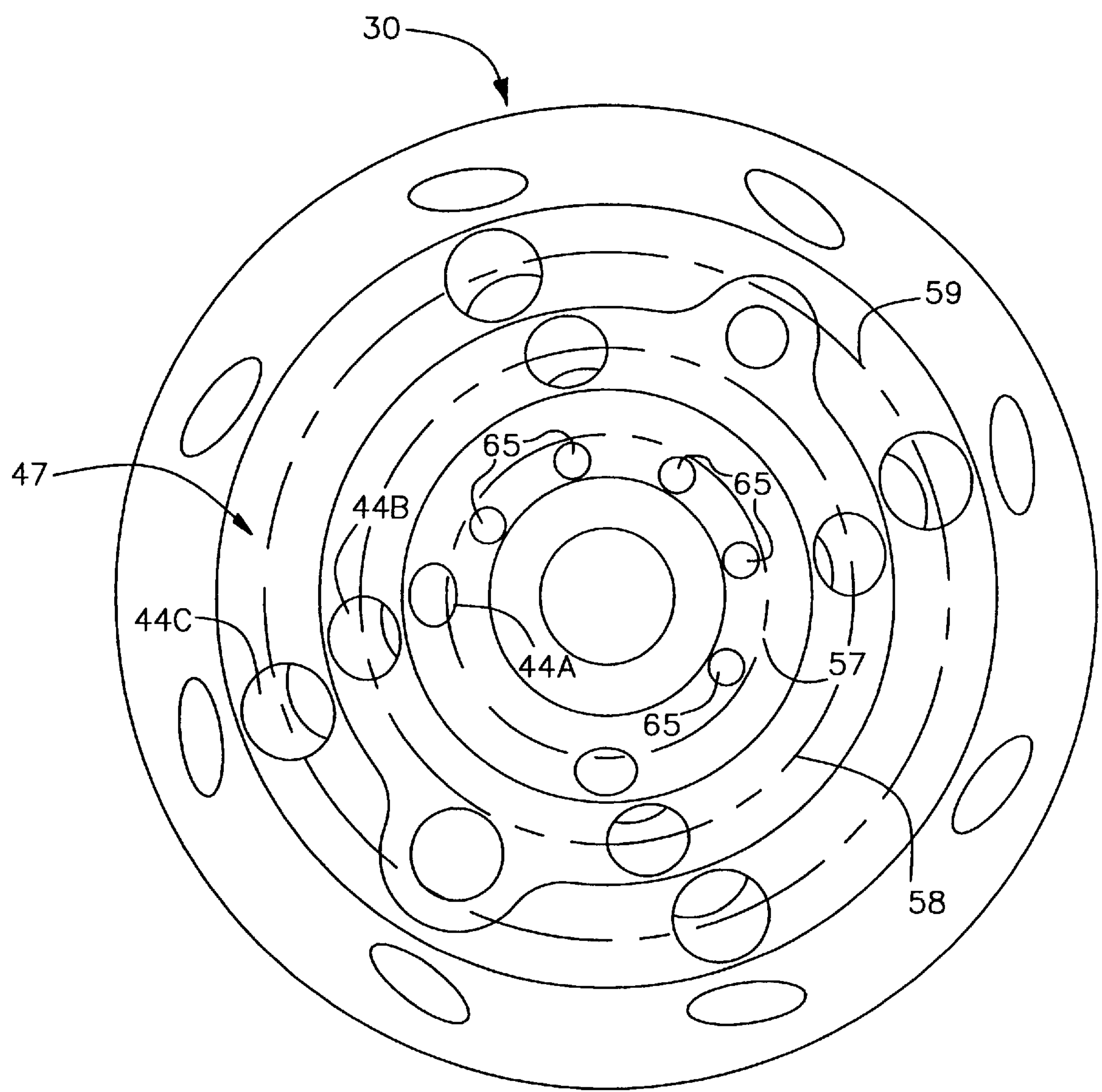
FIG. 4 is an end view as seen along line 4—4 of FIG. 3.

The mixing portion 41 of the nozzle 30 carries multiple combustion air ports 44A–C for thoroughly mixing combustion air with fuel to produce a combustible mixture. In the currently preferred embodiment, the combustion air ports are located at discrete radial distances from the axis 45. As best shown in FIG. 4, the innermost combustion air ports 44A are located at a first radial distance indicated by reference diameter 57. The intermediate and outer combustion air ports 44B, 44C are located at increasingly greater radial distances indicated by reference diameters 58 and 59, respectively. Each combustion air port 44A–C has a port axis along which the port is disposed.

Figure 5:
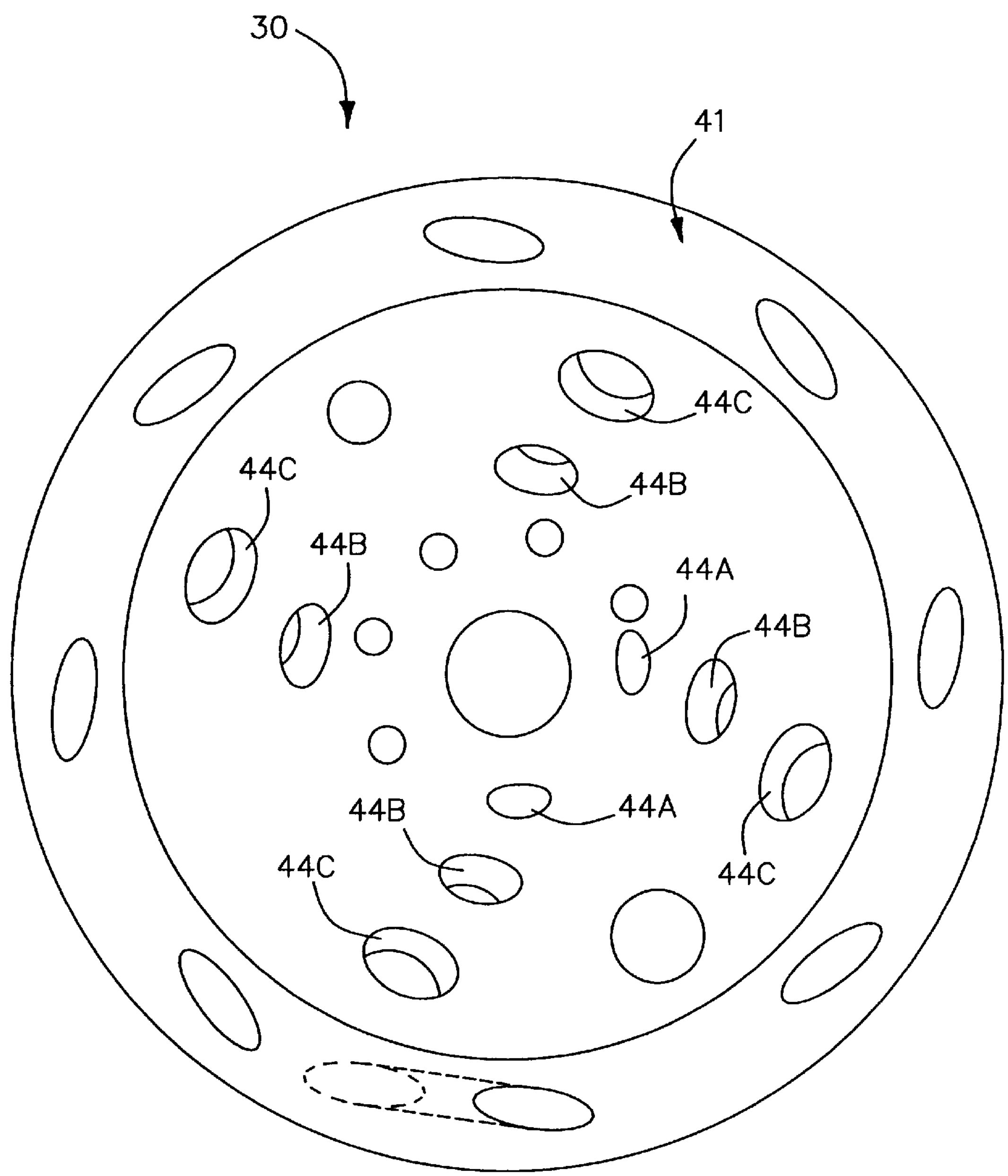
FIG. 5 is an end view as seen along line 5—5 of FIG. 3.

In the currently preferred embodiment, the combustion air ports 44A–C further have varying diameters, as best shown in FIGS. 4 and 5. The diameters of the combustion air ports generally increase as the radial distance of the port increases. As shown most clearly in FIG. 4, the extreme inner ports 44A have significantly smaller diameters than the outer ports 44C. The intermediate ports 44B have a diameter falling approximately midway between the diameters of the ports 44A and 44C.

The ports 44A–C are disposed at compound angles to produce a spiral air flow downstream of the nozzle 30. Each combustion air port 44 is disposed at a compound angle having a first component defined herein as an axial angle, indicated in FIG. 2 as angles A1, A2, and A3. The axial angle is defined herein as the angle between the horizontal axis 45 and the port axis as projected onto a first plane which is parallel to the page in FIG. 2. Accordingly, the axial angle generally indicates the distance downstream of the nozzle at which air flowing through the port will reach the axis 45. A large axial angle A will cause combustion air to reach the axis 45 more quickly, thereby causing more immediate mixing with the fuel. A small axial angle A causes air to more gradually reach the axis 45 to mix with the fuel further downstream.

Figure 3:
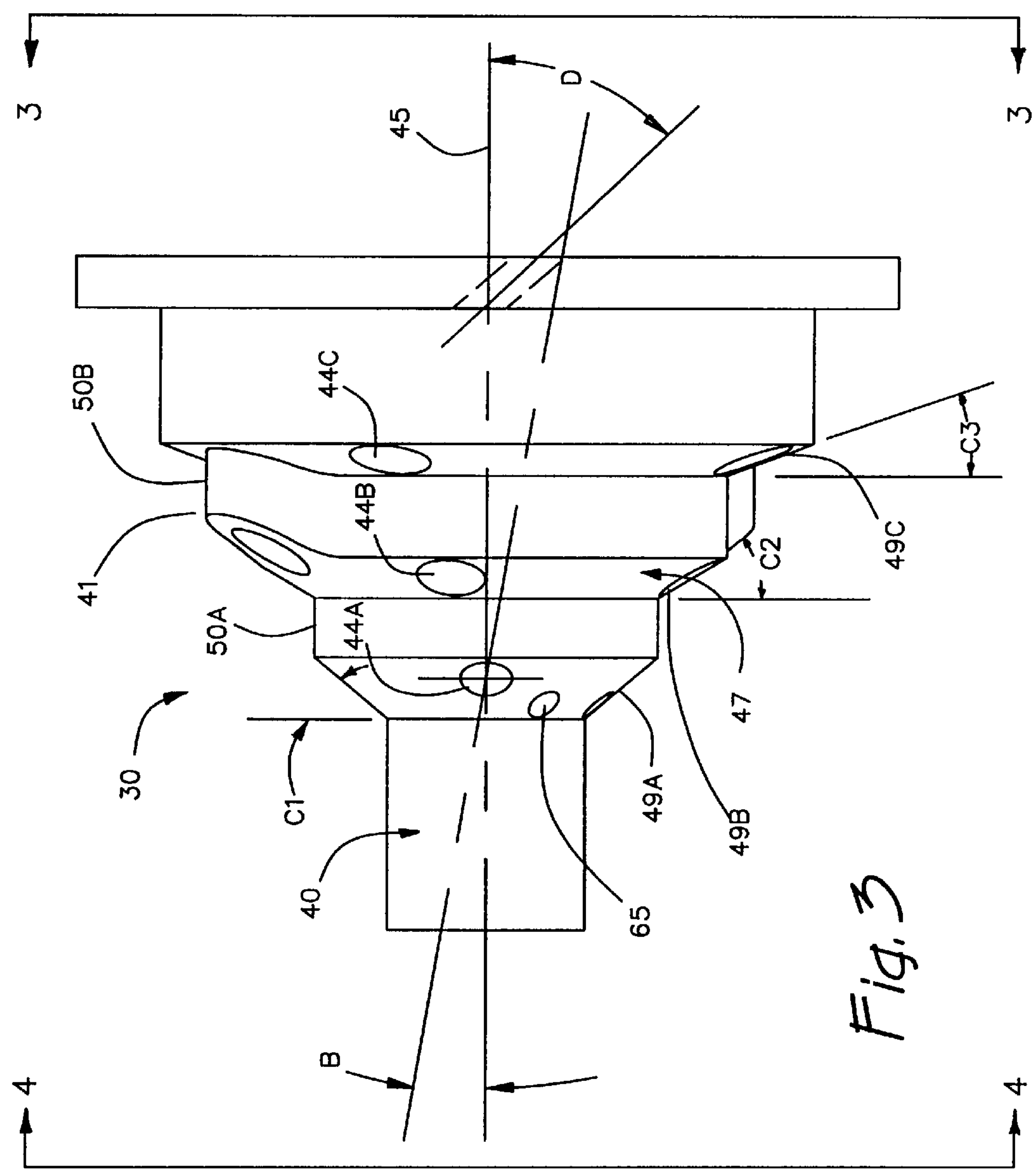
FIG. 3 is a side elevational view of the nozzle.

Each port further has a tangential angle, illustrated in FIG. 3 as angle B. The tangential angle is the angle between the horizontal axis 45 and each port axis as projected onto a second plane that is perpendicular to the first plane and parallel to the page in FIG. 3. The tangential angle generally indicates the degree of swirl imparted to the air flowing through the port. A small angle B creates a helical flow pattern having relatively loose spirals, while a large angle B creates tighter spirals.

In accordance with certain aspects of the present invention, combustion air ports 44A–C are formed at different axial angles to provide more uniform combustion along the length of the firing tube portion 61 of the inner tube 35. As illustrated in FIG. 2, the extreme inner ports 44A form a first combustion zone, each port having a relatively large axial angle A1. Combustion air flowing through ports 44A mixes with fuel from the orifice 43 immediately downstream of the outlet tube 42 to produce a combustible mixture. The intermediate combustion air ports 44B provide a second combustion zone, each port 44B having a somewhat smaller axial angle A2 to mix with fuel further downstream from the outlet tube 42. Finally, combustion air ports 44C form a third combustion zone. The ports 44C have a still smaller axial angle A3 for mixing with the fuel still further downstream of the outlet tube 42. According to the illustrated embodiment, A1 is approximately 40°, A2 is approximately 30°, and A3 is approximately 20°. As a result, the combustion air ports 44A–C mix combustion air with fuel at different stages to produce a combustible mixture along the length of the tube. The staged mixing allows for a more uniform combustion along the firing tube portion 61 which minimizes the creation of hot spots, thereby increasing the life of the burner assembly 20. Uniform combustion further allows the burner assembly 20 to be used with a greater range of fuel inputs and reduces $NO_x$ emissions.

It will further be appreciated that the staged mixing allows for more accurate UV flame sensing over a wide range of inputs. The nozzle 30 of the present invention produces staged mixing, which creates combustion along the length of the inner tube 35. As a result, flame is more reliably present at a predetermined sensing point. Furthermore, the nozzle 30 creates more thorough mixing at low fire conditions, thereby providing adequate flame for producing a relatively strong UV signal for lower inputs.

In the illustrated embodiment, the combustion air ports 44A–C all have the same tangential angle B, which is approximately 10°. The present invention, however, contemplates the use of different tangential angles for the different stages of ports.

In accordance with additional aspects of the present invention, the nozzle 30 has an outer face 47 disposed normal to each combustion air port 44A–C to provide better air flow through the nozzle. As best illustrated in FIGS. 2 and 3, a mixing portion 41 of the nozzle 30 has a generally frustoconical inner wall 48 which flares radially outwardly from the collar 40. The outer wall 47, however, is formed so that it is normal to the axial angle A of each combustion air port 44A–C.

For the mixing portion 41 described above having staged combustion air ports 44A–C, the outer wall 47 has a tiered shape so that the outer wall provides a surface which is normal to each combustion air port. As best shown in FIG. 3, the outer wall 47 has three generally frustoconical entrance surfaces 49A–C connected by two generally cylindrical transition walls 50A and B. Each entrance surface 49A–C is formed so that it is generally normal to the axial angle A of the combustion air port 44A–C extending therethrough. For example, entrance surface 49A is formed at an angle C1 which is substantially normal to angle A1. In the illustrated embodiment, angle C1 is approximately 40°. Because each combustion air port 44A–C is disposed at a different axial angle A, the entrance surfaces 49B and C are also disposed at different angles C2 and C3, thereby requiring the stepped or tiered shape illustrated in FIGS. 2 and 3.

By providing entrance surfaces normal to the axial angle of each combustion air port, the combustion air flows through the nozzle 30 with minimal disturbance and therefore more accurately directs the combustion air to form the desired downstream helical air flow patterns. It will further be appreciated that the tiered outer wall makes it easier to machine the combustion air ports, thereby reducing manufacturing costs.

In the currently preferred embodiment, the angle between opposing portions of the inner wall 48 of the mixing portion 41 is between 50–100 degrees, defined herein as the vertex angle. Vertex angles less than 50 degrees have been found to create an unstable flame. The flame in such a cone is even more unstable at lower inputs, where the air flow overcomes fuel flow due to a lower turndown ratio. At vertex angles greater than 100 degrees, the flame is stable but creates less recirculation of combustion products. Reduced recirculation causes a greater amount of soot to be generated during operation. Accordingly, the mixing portion 41 preferably has a vertex angle of between 50–100 degrees to provide a stable and clean flame.

To further improve the uniformity of combustion along the firing tube portion 61, the nozzle 30 preferably has final combustion air ports 52 for producing a combustible mixture farthest downstream of the nozzle 30 (FIG. 2). The final combustion air ports 52 are formed with a tangential angle D (FIG. 3) which is substantially greater than the tangential angles of the combustion air ports 44A–C. In the currently preferred embodiment, the tangential angle D is approximately 70°. The final combustion air ports 52 further have a minimal axial angle which, in the illustrated embodiment is 0. Accordingly, the final combustion air ports 52 produce a relatively tight spiral air flow path downstream of the nozzle 30. This air flow path is not directly aimed at the axis 45, and therefore mixes with fuel at a point farthest downstream of the nozzle. Before mixing and combusting, the outside spiral air flow path cools the firing tube portion 61 of the inner tube 35 near the nozzle 30 to increase the life of the tube. The final ports 52 provide jets of combustion air which scrub the surface of the inner tube 35, thereby increasing heat transfer efficiency. The final ports 52 also prevent the firing tube portion 61 of the inner tube 35 from overheating near the nozzle 35, thereby minimizing a common hot spot in the system and improving temperature uniformity. The final ports 52 further cool the environment around the nozzle 30 and inner tube 35, resulting in a lower combustion temperature which reduces $No_x$ emissions.

In accordance with additional aspects of the present invention, the nozzle 30 has a pattern of holes 65 to allow UV flame sensing (FIGS. 3 and 4). The UV sensing holes are positioned as close as possible to the horizontal axis 45 of the nozzle 30 without interfering with the collar 40. The holes 65 provide sight lines for sensing the flame produced downstream of the nozzle 30. It will be appreciated that the position of the flame almost continually changes. The nozzle 30 therefore has a plurality of holes 65 disposed in a pattern to increase the likelihood that the flame will be sensed. The UV sensing holes 65 are sized to optimize the area of the sight lines while maintaining the good mixing characteristics of the nozzle 30. With larger holes, the UV sensing is better but the mixing is poorer. With smaller holes, UV sensing is more difficult but mixing is better. Accordingly, holes 65 having intermediate diameters to balance these two considerations are preferred. The pattern of UV sensing holes 65 combined with the more uniform combustion of the present invention provide improved UV sensing over a larger UV turndown ratio which approaches the physical fuel turndown ratio of the system.

According to further aspects of the present invention, the outlet tube 42 has at least one transverse relief port 54 which ensures fuel flow into the mixing portion 41 of the nozzle 30 in the event of air pressure fluctuations. As best shown in FIG. 2, two relief ports 54 extend transversely through the outlet tube 42 from the orifice 43. The relief ports 54 intersect the passage 51 and are located upstream of the discharge orifice 43. In the preferred embodiment, the total cross-sectional area of all the relief ports 54 is equal to ¼ the area of the passage 51. Because the relief ports 54 are disposed at a different angle and location than the orifice 43, air pressure fluctuations will act differently at the relief ports then at the orifice. Back pressures which act to plug the orifice 43 do not plug the relief ports 54. As a result, fuel continues to flow through the relief ports 54 to maintain combustion.

The above-described nozzle 30 is suitable for use with all known types of gaseous fuel. As noted in Collier U.S. Pat. No. 5,241,949, the fuel discharge orifice 43 may be located so that it is downstream of at least some of the combustion air ports 44A–C. According to the illustrated embodiment, the discharge orifice 43 is axially located approximately even with the combustion air port 44B. By virtue of this arrangement, combustion air entering the combustion air ports 44A and B mixes with the fuel immediately upon discharge from the orifice 43 thereby improving mixing of fuel and air, which reduces the amount of soot generated during operation. Soot reduction is especially important when propane or butane is used as the fuel, since these fuels have a greater tendency to generate soot. When using natural gas as the fuel, the orifice 43 is located further upstream, since natural gas does not create soot problems like propane and butane and therefore rapid mixing with combustion air is not necessary.

From the above, it will be appreciated that the present invention provides a new and improved burner assembly for a radiant tube burner which produces uniform combustion along the length of the tube. The burner assembly incorporates a nozzle having combustion air ports disposed at different axial angles to produce staged mixing of combustion air with fuel. Each stage of the mixing is directed at a different point along the inner tube. As a result, the combustion flame is spread uniformly along the length of the tube, thereby minimizing hot spots and $NO_x$ emissions, and increasing the life of the burner assembly. In addition, the burner may be used with a greater range of inputs. The nozzle further has a tiered outer wall which provides entrance surfaces disposed normal to the axial angle of each combustion air port. The entrance surfaces provide for more consistent and direct air flow through the combustion air ports, thereby more accurately directing spiral air flow paths downstream of the nozzle. In addition, the present invention ensures that fuel flow will continue in the event of air pressure fluctuations. Relief ports extend transversely through an outlet tube of the nozzle to provide secondary fuel flow paths in the event that the orifice is plugged. As a result, fuel will continue to flow despite air pressure fluctuations creating a back pressure at the orifice.

What is claimed is:

1. A nozzle adapted for installation in a burner attached to a fuel supply and a combustion air supply the burner directing fuel and air from the fuel and air supplies downstream along a longitudinal axis through the nozzle to mix downstream of the nozzle, the nozzle comprising:

a collar adapted for attachment to the fuel supply;

an outlet tube extending from the collar in the longitudinal axis the outlet tube having a passage extending through the outlet tube for fluid communication through the collar; and a mixing portion extending radially from the collar, a plurality of combustion air ports extending through the mixing portion each combustion air port being located at a radial distance from the longitudinal axis a plane thereby being formed by the combination of the longitudinal axis and the radial distance for each combustion air port each combustion air port being angled radially inwards at an axial angle relative to the longitudinal axis and towards the longitudinal axis each combustion air port being skewed at a tangential angle relative to its plane and therefore not lying in its plane for producing a swirling effect, the mixing portion further including first, second and third sets of combustion air ports the first set having at least one first combustion air port disposed at a first axial angle and at a first radial distance from the horizontal axis, the second set having at least one second combustion air port disposed at a second axial angle and at a second radial distance from the horizontal axis, the third set having at least one third combustion air port disposed at a third axial angle and at a third radial distance from the horizontal axis, the first second and third axial angles being different, the first, second and third radial distances being different.

2. The nozzle of claim 1 in which the first axial angle is approximately 40°, the second axial angle is approximately 30° and the third axial angle is approximately 20°.

3. The nozzle of claim 1 in which the tangential angle of each combustion air port is approximately 10°.

4. The nozzle of claim 1 further comprising at least two UV sensing holes extending through the mixing portion.

5. A nozzle adapted for installation in a burner attached to a fuel supply and a combustion air supply, the burner directing fuel and air from the fuel and air supplies downstream along a longitudinal axis through the nozzle to mix downstream of the nozzle, the nozzle comprising:

a collar adapted for attachment to the fuel supply, an outlet tube extending from the collar in the longitudinal axis, the outlet tube having a passage extending through the outlet tube for fluid communication through the collar; and a mixing portion extending radially from the collar, a plurality of combustion air ports extending through the mixing portion, each combustion air port being located at a radial distance from the longitudinal axis, a plane thereby being formed by the combination of the longitudinal axis and the radial distance for each combustion air port, each combustion air port being angled radially inwards at an axial angle relative to the longitudinal axis and towards the longitudinal axis, each combustion air port being skewed at a tangential angle relative to its plane and therefore not lying in its plane for producing a swirling effect, the combustion air ports being arranged in at least two sets, each set of combustion air ports having a different axial angle relative to the other sets wherein the mixing portion has a frustoconical shape, the mixing portion having a vertex angle of between 50–100 degrees.

6. A nozzle mounted in a burner, the nozzle attached to a fuel supply and a combustion air supply of the burner, the burner directing fuel and air from the fuel and air supplies downstream along a longitudinal axis and through the nozzle to mix downstream of the nozzle, the nozzle comprising:

a collar attached to the fuel supply;

an outlet tube extending downstream from the collar in the longitudinal axis, the outlet tube including a passage extending through the outlet tube to fluidically communicate through the collar;

a mixing portion extending radially from the collar, a plurality of combustion air ports extending through the mixing portion along respective port axes, each combustion air port being located at a radial distance from the longitudinal axis, a plane thereby being formed by the combination of the longitudinal axis and the radial distance for each combustion air port, each combustion air port being angled radially inwards at an axial angle relative to the longitudinal axis and towards the longitudinal axis, each combustion air port being skewed at a tangential angle relative to its plane and therefore not lying in its plane for producing a swirling effect, the mixing portion having a rear face disposed toward the incoming combustion air, the rear face providing a plurality of entrance surfaces, each entrance surface surrounding an associated combustion air port and disposed substantially normal to the port axis of the associated combustion air port.

7. The nozzle of claim 6 in which the mixing portion has a generally frustoconical shape.

8. The nozzle of claim 7 in which the mixing portion has a vertex angle of between 50–100 degrees.

9. The nozzle of claim 6 in which the combustion air ports have different axial angles.

10. The nozzle of claim 9 in which the combustion air ports are located on the mixing portion at discrete radial distances, each radial distance corresponding to a combustion zone, the rear face having a tiered shape to provide entrance surfaces for each combustion air port.

11. The nozzle of claim 6 wherein the combustion air ports are arranged in at least two sets on the nozzle for multi-stage combustion, the combustion air ports each set directed at intersecting the longitudinal axis at substantially the same point, each set of combustion air ports having a different axial angle than the combustion air ports of other sets.

12. The nozzle of claim 11 wherein the at least two sets comprises at least three sets, the combustion air ports of each set having different first, second and third axial angles, respectively.

13. The nozzle of claim 12 in which the first axial angle is approximately 40°, the second angle is approximately 30° and the third axial angle is approximately 20°.

14. The nozzle of claim 6 in which the tangential angle of each combustion air port is approximately 10°.

15. The nozzle of claim 6 further comprising at least two UV sensing holes extending through the mixing portion.

* * * * *